United States Patent [19]

Kaufmann et al.

[11] Patent Number: 4,710,863
[45] Date of Patent: Dec. 1, 1987

[54] PROGRAMMING DEVICE FOR A STORED-PROGRAM CONTROLLER

[75] Inventors: Felix Kaufmann, Mülligen; Daniel Schillinger, Fislisbach, both of Switzerland

[73] Assignee: BBC Brown, Boveri & Company, Limited, Baden, Switzerland

[21] Appl. No.: 854,602

[22] Filed: Apr. 22, 1986

[30] Foreign Application Priority Data

Apr. 25, 1985 [CH] Switzerland .......................... 1763/85

[51] Int. Cl.⁴ .............................................. G06F 15/46
[52] U.S. Cl. .................................. 364/146; 364/191; 364/900
[58] Field of Search .................... 364/140–147, 364/171, 191–193, 900 MS File, 200 MS File

[56] References Cited

U.S. PATENT DOCUMENTS

| | | | |
|---|---|---|---|
| 4,092,730 | 5/1978 | Burkett et al. | 364/900 |
| 4,093,998 | 6/1978 | Miller | 364/900 |
| 4,371,922 | 2/1983 | Fujita et al. | 364/900 X |
| 4,404,625 | 9/1983 | Saito et al. | 364/900 X |
| 4,488,258 | 12/1984 | Struger et al. | 364/146 X |
| 4,542,452 | 9/1985 | Fukai et al. | 364/146 X |
| 4,566,061 | 1/1986 | Ogden et al. | 364/146 |

*Primary Examiner*—Joseph Ruggiero
*Attorney, Agent, or Firm*—Burns, Doane, Swecker & Mathis

[57] ABSTRACT

The present invention relates to a programming device for a stored-program controller, in which the control program of the controller, containing function calls and stored in a machine-readable form, is displayed in function-diagram representation on a graphical display device by the operating system of a digital computer contained in the programming device. The invention proposes operations in the operating system of the digital computer by means of which the prerequisites are created for the automatic generation of function-diagram representations in which signal branchings and signal intersections are permissible and which, therefore, have a considerably higher information content than the purely hierarchically structured function-diagram representations hitherto generated.

2 Claims, 7 Drawing Figures

PROGRAMMING DEVICE FOR A STORED-PROGRAM CONTROLLER

BACKGROUND OF THE INVENTION

The present invention relates to a programming device for a stored-program controller.

In modern [closed-loop and open-loop] control technology, a programming device for a stored-program controller is generally understood to mean a small data processing system which is of compact construction and therefore easily transportable and which can be connected via a standardized interface to a large number of different controllers. In the programming device, all the functions which are necessary for generating and maintaining the control programs for the stored-program controllers are combined. For this reason, the corresponding functions do not need to be provided in the controllers themselves. To facilitate the programming work for the control technician, programming devices allow programming to be carried out directly at the function diagram level, that is in a representation which is particularly familiar to the control technician. For this purpose, the function diagram of the respective controller is represented on a graphic display device of the programming device and the user can carry out changes or additions to the function diagram by means of simple commands. The control program associated with the function diagram is automatically generated by the programming device without intervention by the user. Conversely, the programming device automatically generates the associated function diagram on the display device from an already existing machine-readable stored control program.

A programming device of the type described is known, for example, from a book by Hans Berger, published by Siemens Aktiengesellschaft, Berlin and Munich, having the title "Steuerungen programmieren mit STEP 5" ["Programming controllers with STEP 5"], volume 1, 4th edition, 1984. Even in the known programming device, the user can generate the control program for the stored-program controller directly in the function diagram. However, the known programming device operates with a function-diagram representation of greatly restricted generality in which the individual function blocks are exclusively hierarchically linked to each other and in which, therefore, no signal branchings and signal intersections can occur. If, for example, one and the same signal is needed as an input signal by two function blocks, which is frequently the case, the known progamming device generates two separate part-function diagrams on the display device in order to avoid signal branchings in the function diagram. This detracts from the clarity and the information density of the picture shown. But clarity and information density of the picture shown are decisive factors in the handling and in the ease of operating the programming device. Since the profitability of program generation and program maintenance, and thus the efficient processing of the automation tasks overall increasingly depends on simple handling and great ease of operation, the generation of function diagram representations with higher information density is urgently required.

In general, however, the generation of function diagram representations of more complicated configurations is associated with a higher computing effort for the digital computer. Its computing power and storage capacity, however, cannot be easily increased without concessions in size, weight and price.

The present invention achieves the object of providing in a programming device of the type initially mentioned operations in the operating system of the digital computer by means of which the function blocks in the function diagram representations are efficiently automatically arranged in such a manner that signal branchings and signal intersections can also be represented between them.

The advantages achieved by the invention can be essentially seen in the fact that the success aimed for, that is to say the automatic generation of function diagram representations including signal branchings and signal intersections, and therefore high information density, is achieved in a particularly efficient manner. No increase in computing power and in the storage capacity of the digital computer is required.

BRIEF DESCRIPTION OF THE DRAWINGS

In the text which follows, an illustrative embodiment of the invention is explained with the aid of the drawing, in which.

DETAILED DESCRIPTION OF THE PREFERRED EMBODIMENT

Figure 1:
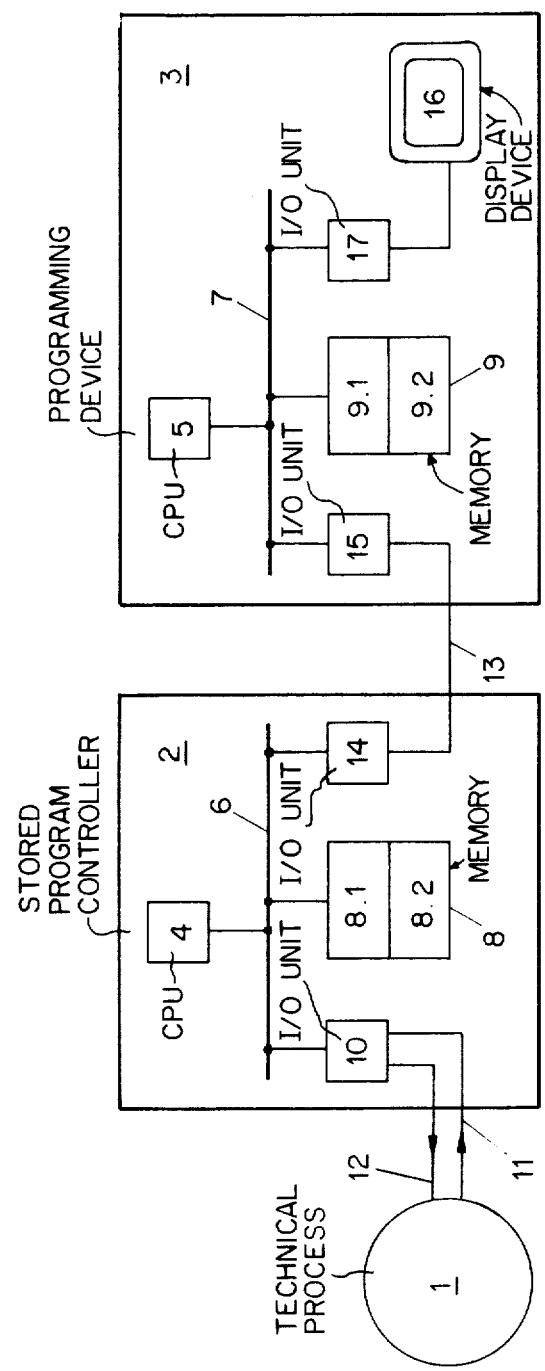
FIG. 1 is a schematic representation of a stored-program controller which is coupled to a technical process and to which a programming device is connected.

Referring to FIG. 1, a technical process, which is simply diagrammatically represented by a circle 1, is monitored and controlled by a stored-program controller 2. The stored-program controller 2 is connected to a programming device 3. Both the stored-program controller 2 and the programming device 3 include a digital computer. The digital computers of the controller 2 and the programming device 3 include a central processing unit 4 and 5 which are connected to main memories 8 and 9 via buses 6 and 7, respectively. The technical process 1 is coupled via input 11 and output lines 12 via a first input/output unit 10 to the bus 6 of the stored-program controller 2. The connection between the stored-program controller 2 and the programming device 3 is established via a line 13. The line 13 is connected via input/output units 14 and 15 to the buses 6 and 7, respectively. This connection is preferably constructed as a plug-in connection so that the programming device 3 can easily be separated from the stored-program controller 2. Finally, the bus 7 of the programming device 3 is also connected to a graphic display device 16, again via an input/output unit 17. For reasons of clarity, it is noted that, naturally, all lines drawn in FIG. 1 can consist, and as a rule also do consist, of a large number of parallel lines.

In the arrangement shown in FIG. 1, the central processing unit 4 of the digital computer in the stored-program controller 2 cyclically runs in the usual manner a control program which is contained in a first part 8.1 of the main memory 8. During this process, for example, it will read actual values, supplied by measuring instruments, not shown in FIG. 1 and installed at the technical process 1, via the input lines 11 and the input/output unit 10 and the bus 6 into a second part 8.2 of the main memory 8, link them to nominal values previously stored in this part, derive adjusting values therefrom and, in turn, supply these values via bus 6 and the input/output unit 10 and the output lines 12 to the technical process 1 and particularly adjusting members which are installed there and which are also not shown in FIG. 1. The programming device 3 is used for generating and maintaining and for graphically representing the control program contained in the first part 8.1 of the main memory 8 of the stored-program controller 2. All instructions required for this purpose for the central processing unit 5 of the digital computer in the programming device 3 are combined in an operating system which is contained in a first part 9.1 of the main memory 9. The control program of the stored-program controller 2 can be generated, for example, in a second part 9.2 of the main memory 9 and, after having been completed, can be coupled into the first part 8.1 of the main memory 8 of the stored-program controller 2. A control program already existing in the first part 8.1 of the main memory 8 can be copied for maintenance purposes into the second part 9.2 of the main memory 9 in the programming device 3, can there be changed and copied back again in the modified form. Naturally, the programming device 3 must be connected via the line 13 to the stored-program controller 2 during all copying processes. For the rest, however, both devices operate completely independently of each other.

From the control program, stored in the second part 9.2 of the main memory 9 in the programming device 3, of the stored-program controller 2 which, of course, does not represent a program to be executed but a data record to be processed as far as the central processing unit 5 of the programming device 3 is concerned, the latter generates the desired function diagram representation on the graphic display device 16 by executing operations in its operating system which form the subject-matter of the present invention.

Figure 2:
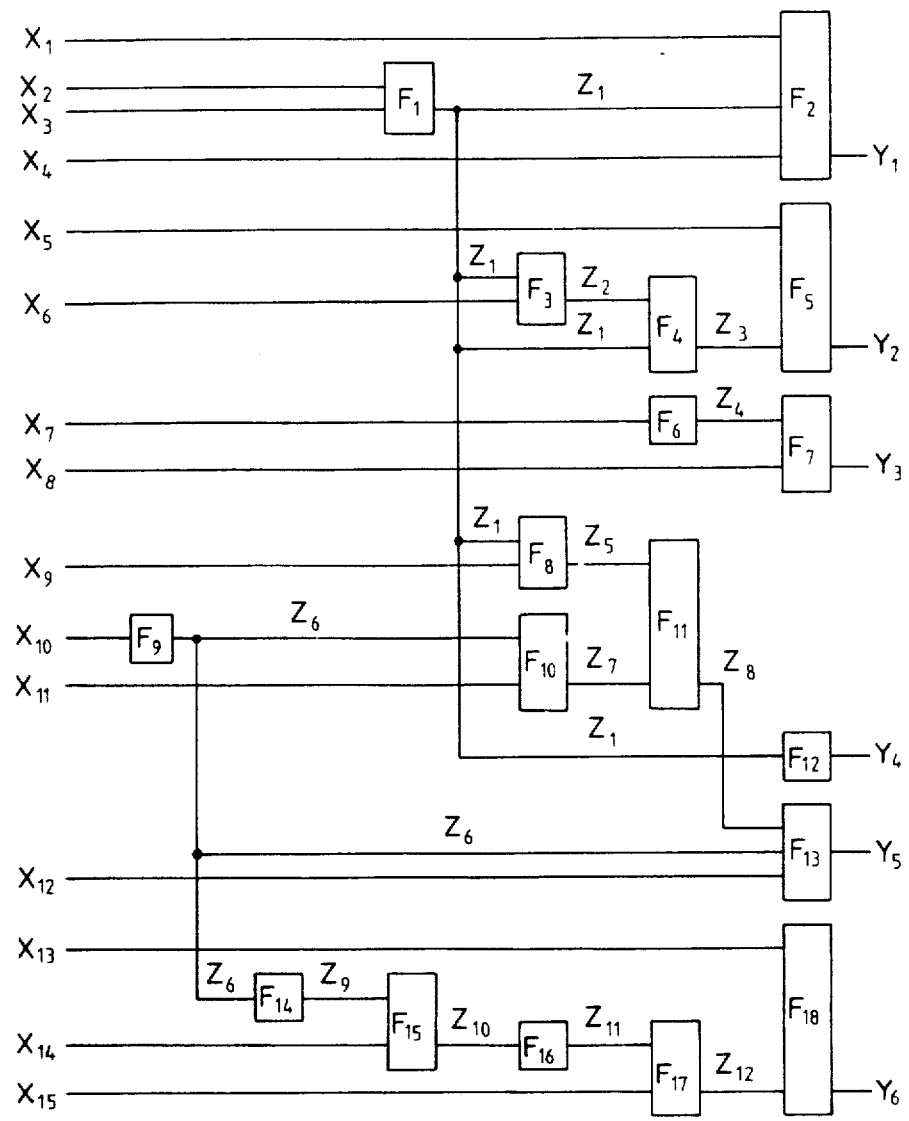
FIG. 2 is an exemplary function diagram of a control program of a stored-program controller.

FIG. 2 shows an example of a function diagram representation of a control program of a stored-program controller. The function diagram consists of rectangular function blocks $F_i$, where $i=1$ to 18. The function blocks $F_i$ can be any function blocks, for example according to DIN 40700, Part 14/IEC 117-15 and DIN 40719/IEC 113-7. The function diagram is read from left to right, that is the left-hand side is the input side and the right-hand side is the output side of the function blocks $F_i$. Signals $x_i$, where $i=1$ to 15 and of which, for example, a portion can correspond to the actual values derived from the technical process 1 and another portion can correspond to the nominal values, proceed in the horizontal direction from the left into the function diagram. Signals $y_i$, where $i=1$ to 6 which can correspond, for example, to the adjusting values for the technical process 1, leave the function diagram to the right, also in the horizontal direction. Finally, the function diagram contains signals $z_i$, where $i=1$ to 12 and which exclusively proceed between individual function blocks $F_i$ and which do not proceed into the function diagram from the left-hand edge nor leave it to the right. The signals $z_i$ are generated in the function diagram itself and are both output signals of the function blocks $F_i$ generating them and input signals of other function blocks F. Thus, for example, the output signal $z_1$ of the function block $F_1$ is one of the input signals of the function block $F_2$. The function block $F_2$ is therefore dependent on the function block $F_1$ with respect to signals. However, the output signal $z_1$ of the function block $F_1$ is also used as input signal for the function blocks $F_3$, $F_4$, $F_8$ and $F_{12}$, in addition to $F_2$. This multiple signal dependence of function blocks $F_i$ is shown in the function diagram according to FIG. 2 by means of signal branchings and signal intersections. The function diagram according to FIG. 2 is therefore of the type which is to be automatically generated in accordance with the invention. Another multiple signal dependence is moreover produced in the function diagram of FIG. 2 with respect to the output signal $z_6$ of the function block $F_9$. In addition, the output signal $z_6$ contributes to the formation of the output and input signals $z_9$ to $z_{12}$ and $y_6$. All function blocks $F_{14}$ to $F_{18}$ therefore depend on the function block $F_9$ with respect to signals.

In the text which follows, the operations according to the invention for the automatic generation of function diagrams of the type of FIG. 2 are described. As previously stated, these operations must be provided in the operating system for the central processing unit 5 in the digital computer of the programming device 3.

It is assumed that the control program for the stored-program controller 2, for which a function diagram is to be generated, is stored in a machine-readable manner in the second part 9.2 of the main memory 9 in the programming device 3. It is also assumed that a function module which is provided with an identification and can be called up by means of a function call exists in the control program for each signal processing function to be represented by a function block $F_i$ in the function diagram. In this arrangement, the function calls should contain the identification of the function module to be called up in each case and its input and output parameters corresponding to the input and output signals in the function diagram.

As a first operation, the control program must be examined for function calls from beginning to end. During the search procedure, each function call found is sequentially, that is to say in the sequence of its occurrence in the control program, written into a file, together with the list of its associated input and output parameters. The file can be located, for example, next to the control program in the second part 9.2 of the main memory 9 in the programming device 3.

The control program on which the function diagram of FIG. 2 is based, would result in the following sequence of function calls in the file:

| | |
|---|---|
| $F_1$ | $(x_2, x_3, z_1)$ |
| $F_2$ | $(x_1, z_1, x_4, y_1)$ |
| $F_3$ | $(z_1, x_6, z_2)$ |
| $F_4$ | $(z_2, z_1, z_3)$ |
| $F_5$ | $(x_5, z_3, y_2)$ |
| $F_6$ | $(x_7, z_4)$ |
| $F_7$ | $(z_4, x_8, y_3)$ |

-continued

| | |
|---|---|
| $F_8$ | $(z_1, x_9, z_5)$ |
| $F_9$ | $(x_{10}, z_6)$ |
| $F_{10}$ | $(z_6, x_{11}, z_7)$ |
| $F_{11}$ | $(z_5, z_7, z_8)$ |
| $F_{12}$ | $(z_1, y_4)$ |
| $F_{13}$ | $(z_8, z_6, x_{12}, y_5)$ |
| $F_{14}$ | $(z_6, z_9)$ |
| $F_{15}$ | $(z_9, x_{14}, z_{10})$ |
| $F_{16}$ | $(z_{10}, z_{11})$ |
| $F_{17}$ | $(z_{11}, x_{15}, z_{12})$ |
| $F_{18}$ | $(x_{13}, z_{12}, y_6)$ |

The designation of the function blocks $F_i$ was used above for the designation of the function calls and the designation of the signals $x_i$, $y_i$ and $z_i$ from FIG. 2 for the designation of the parameters. This mode of designation will also be retained below.

Next, the file must be split by allocating the function calls $F_i$ to totally ordered part sequences of function calls $F_i$. Beginning with the last function call $F_{imax}$, each function call $F_i$ whose output parameter $z_i$ does not contribute to the formation of an input parameter $z_i$ of a function call $F_i$ already allocated to the respective part sequence is allocated to a new part sequence.

Figure 3:
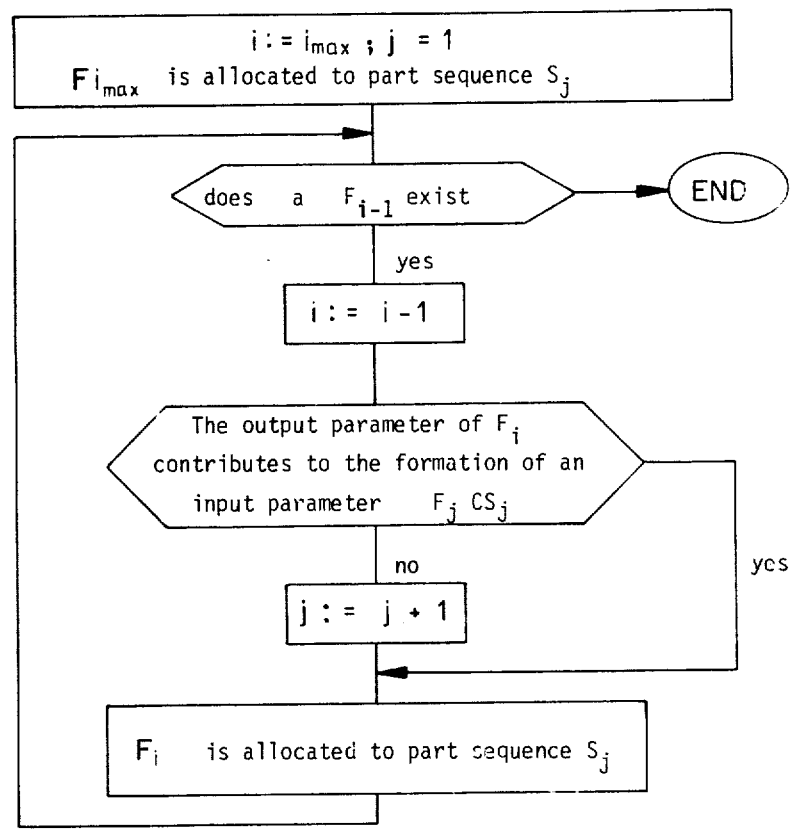
FIG. 3 is a first flow chart for explaining the splitting, provided in accordance with the invention, of a file containing function calls into part-sequences of function calls.

FIG. 3 shows a flow chart for this splitting operation. The part sequences produced by the splitting are designated by $S_j$. At the beginning of the operation, the index i of the function calls $F_i$ is set to be equal to $i_{max}$, that is to say equal to the largest index of the function calls $F_i$ occurring in the file, that is to say equal to 18 in the example of the function diagram according to FIG. 2. The index j of the part sequences $S_j$ is set to be equal to 1 at the beginning of the operation. A loop is then entered by means of the request "Does an $F_{i-1}$ exist". If a function call $F_{i-1}$ exists in the file, the program runs through the loop; if this is no longer the case, for example after continuous decrementing of the index i within the loop after reaching the first function call $F_1$ in the file, the operation is terminated. As has just been stated, the index i is first decremented by the value 1 within the loop; the program then asks whether the output parameter of the function call having the now current value of the parameter i contributes to the formation of an input parameter of a function call $F_i$ ($F_i \in S_j$) already allocated to the part sequence with the now current value of the index j. If this is the case, the function call $F_i$ is allocated to the same part sequence $S_j$ as the function call $F_{i+1}$, that is to say to the part sequence $S_1$ at the beginning. However, if this is not the case, the index j is first incremented by the value 1 and the function call $F_i$ is allocated to the then new part sequence $S_j$.

For better comprehension, the indices of the part sequences $S_j$ are also reversed after termination of the splitting operation, that is to say the part sequence $S_j$ having the largest index $j_{max}$ resulting from the splitting operation is set to be equal to $S_1$, that with the next-smaller index $j_{max-1}$ is set to be equal to $S_2$ and so forth. This is not shown in FIG. 3.

According to the method described and after reversal of the indices j, the file quoted above as an example and on which the function diagram of FIG. 2 is based, would be split into the following seven part sequences $S_j$:

$S_1$: $F_1$, $F_2$
$S_2$: $F_3$, $F_4$, $F_5$
$S_3$: $F_6$, $F_7$
$S_4$: $F_8$, $F_9$, $F_{10}$, $F_{11}$
$S_5$: $F_{12}$
$S_6$: $F_{13}$
$S_7$: $F_{14}$, $F_{15}$, $F_{16}$, $F_{17}$, $F_{18}$

The part sequences represent part function diagrams within which the function blocks $F_i$ are hierarchically linked to each other and/or depend on each other with respect to signals.

In the function diagram generated according to the invention, the part function diagrams associated with the part sequences $S_j$ are shown to be arranged below each other.

Figure 4:
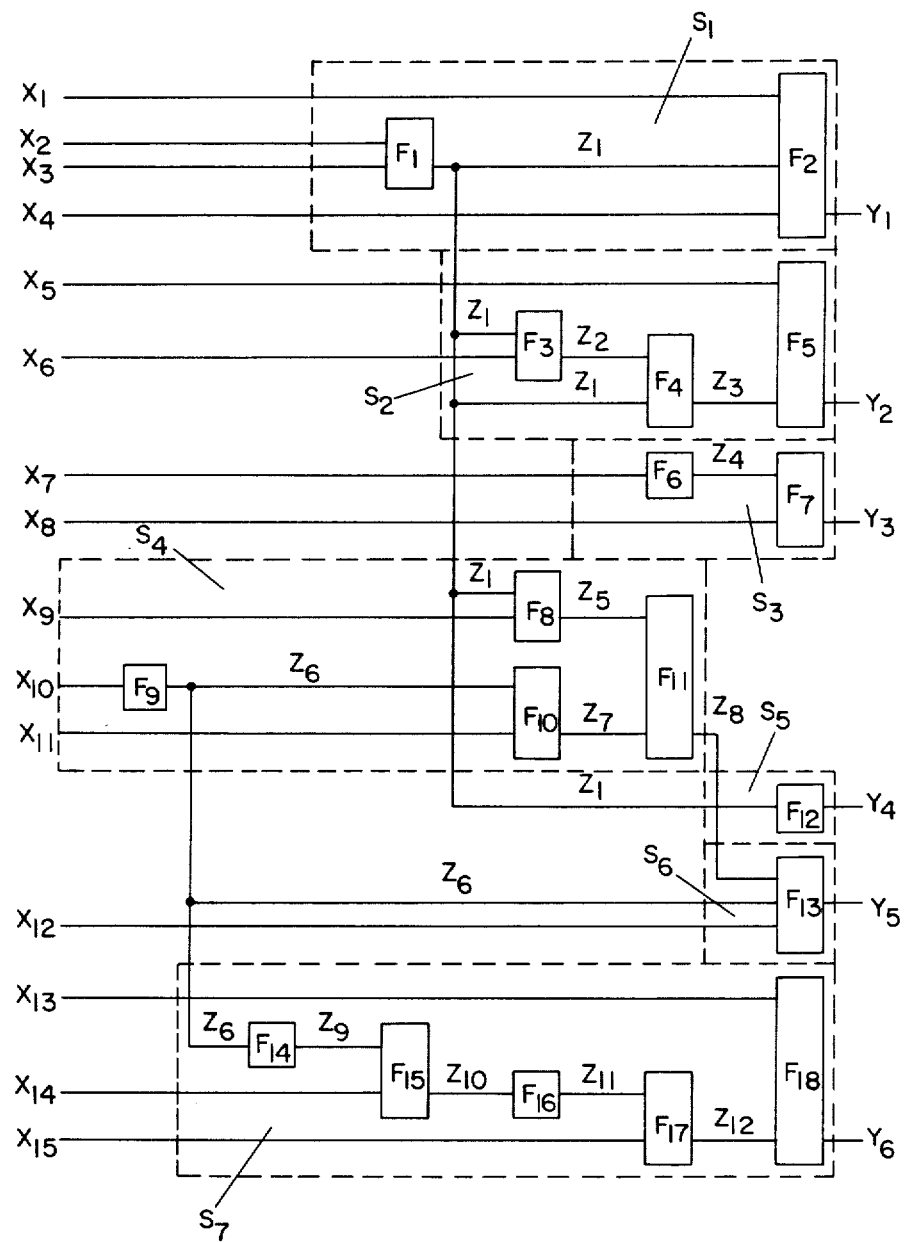
FIG. 4 illustrates the function diagram of FIG. 2 with particular emphasis on the part-function diagrams representing the part sequences.

FIG. 4 shows the function diagram similar to FIG. 2 wherein the part sequences $S_1$ to $S_7$ are shaded gray for better clarity.

After the file has been split into the part sequences $S_j$ in the manner described, the normalized horizontal extensions of the graphic representation of the function blocks $F_i$ and their normalized horizontal displacement are determined in the graphic representation. These extensions and displacements are called normalized because they establish the size of the extension and displacement of the individual function blocks in the graphic representation only in normalized manner, that is to say up to a common scaling factor depending, for example, on the size of the display device 16.

Figure 5:
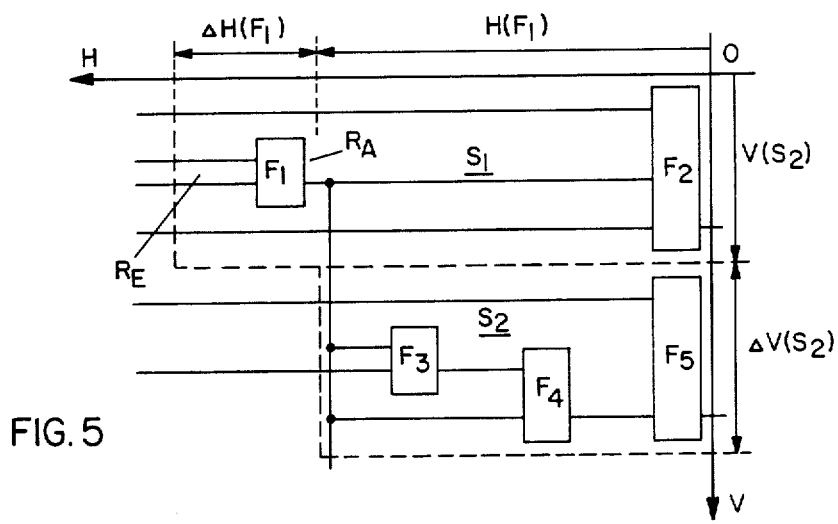
FIG. 5 illustrates a section from the function diagram of FIG. 2.

In FIG. 5, in which a section of the right-hand top corner of the picture of the function diagram according to FIG. 2 is shown and which only shows the function blocks $F_1$ to $F_5$ allocated to the part sequences $S_1$ and $S_2$, the example of the function block $F_1$ is used for illustrating its normalized horizontal extension designated by $\Delta H$ ($F_1$). This is generally determined from the normalized horizontal extension of the respective function block $F_i$ itself plus an edge zone $R_V$ preceding it at the input and an edge zone $R_A$ following it at the output. Also using and on which the function diagram of FIG. 2 is based, the example of the function block $F_1$, its normalized horizontal displacement called $H(S_1)$ is shown which extends in each case from the right-hand edge of the function diagram along the horizontal axis designated by H up to the right-hand edge of the respective function block $F_i$, more accurately up to the beginning of its edge zone $R_A$ at the output.

A first set of variables is provided for the normalized horizontal extensions $\Delta H(F_i)$ of the function blocks $F_i$ in the second part 9.2 of the main memory 9 in the programming device 3, if necessary also in the aforementioned file, and allocated to the individual function calls $F_i$. These variables are also designated by $\Delta H(F_i)$ below. The desired values of the normalized horizontal extensions of the function blocks $F_i$ are simply optionally allocated to the variables $\Delta H(F_i)$, their size depending on the type of the function blocks $F_i$ selected. In the example of FIGS. 2, 4 and 5, all function blocks $F_i$ have the same relative horizontal extension $H(F_i)$.

Accordingly, a second set of variables also allocated to the function calls $F_i$ is provided for the normalized horizontal displacements $H(F_i)$ of the function blocks $F_i$. The designations $H(F_i)$ of the vertical displacements themselves are again also used for the variables of this second set. The values of the variables $H(F_i)$ correspond to the largest of the sums which can be formed for the function call $F_i$ considered in each case from the values of the variables $\Delta H(F_i)$ of the first set to which function calls $F_i$ depending on this function call $F_i$ respect to parameters are allocated. "Dependent with respect to parameters" here means the same as the previously defined "dependent with respect to signals".

Figure 6:
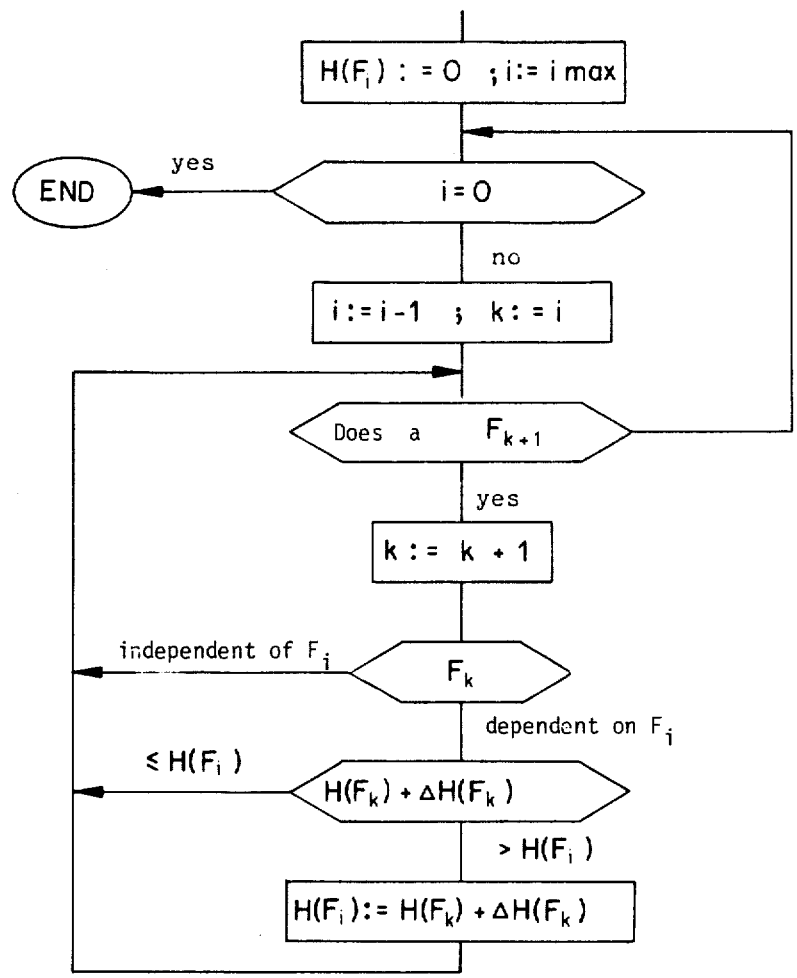
FIG. 6 is a second flow chart for explaining the operations provided, in accordance with the invention, for determining the horizontal shift of the individual function blocks of the function diagram.

To clarify the manner of determining these values, reference is made to the flow chart of FIG. 6. According to the top box of the flow chart, the value 0 is first allocated to all variables $H(F_i)$ of the second set. This is expressed by $H(F_i):=0$. Index i is then set to be equal to $i_{max}$. Similar to the flow chart of FIG. 3, a loop is then entered by means of the request "i=0" which is only left when the value of the index i, decremented within the loop with each pass, has reached the value 0. The operation is terminated in this case.

A horizontal shift $H(F_i)$ is then determined for all function calls $F_i$ of the function diagram. Within the loop, the index i is first decremented by the value 1 and then a further index k is set to be equal to index i for the function calls. A loop, which is inside the first-mentioned loop, is then entered with a request "Does an $F_{k+1}$ exist", from which inner loop the program leaves the the request "k=0" of the first outer loop if no further function call $F_{k+1}$ exists in the file in the inner loop after continuous incrementing of the index k, that is to say if the function call $F_{18}$ has been reached in the case of the example. After incrementing the index k by the value 1 inside the loop, the program asks whether the function call $F_k$ is dependent with respect to parameters or is independent of the function call $F_i$. If the function call $F_k$ is independent of the function call $F_i$, the program returns directly to the start of the inner loop. In contrast, if the function call $F_k$ is dependent on the function call $F_i$ a further request is executed to see whether the sum of the normalized horizontal displacement $H(F_k)$ of the function block $F_e$ and its normalized horizontal extension $H(F_k)$ is greater than or smaller than the normalized horizontal displacement $H(F_i)$ of the function block $F_i$. In the last-mentioned case, the program again returns directly to the start of the inner loop. In the first-mentioned case, the normalized horizontal displacement $H(F_i)$ of the function block $F_i$ is set to be equal to the sum mentioned and only then the program returns to the start of the inner loop.

The manner of determining the normalized horizontal displacement $H(F_i)$ of the function blocks $F_i$ becomes particularly clear by consulting FIG. 5. Neglecting the function blocks $F_6$ to $F_{18}$, which are not even shown in FIG. 5, the index $i_{max}$ is set to $=5$. During the first pass through the outer loop, the normalized horizontal displacement $H(F_4)$ of the function block $F_4$ is then determined.

This is found to be $\Delta H(F_5)$ since the function block $F_5$ is dependent on the function block $F_4$ with respect to parameters and the sum of the normalized horizontal displacement $H(F_5)$, originally set to be equal to zero, of the function block $F_5$ and its non-disappearing normalized horizontal extension $\Delta H(F_5)$ is naturally greater than the normalized horizontal displacement $H(F_4)$, also initially set to be equal to zero, of the function block $F_4$. In the second pass through the outer loop, the normalized horizontal displacement $H(F_3)$ of the function block $F_3$ is determined. Directly during the first pass of the inner loop, this is found to be the sum of the normalized horizontal displacement $H(F_4)$ of the function block $F_4$ and its normalized horizontal extension $\Delta H(F_4)$. This value for the normalized horizontal displacement $H(F_4)$ does not change during the second pass of the inner loop since the sum of the horizontal displacement $H(F_5)$ of the function block $F_5$ and its normalized horizontal extension $H(F_5)$, determined in the second pass, is smaller than the horizontal displacement $H(F_4)$ determined in the first pass. In the case of the normalized horizontal displacement $H(F_2)$, determined during the third pass of the outer loop, of the function block $F_2$ no sum is formed since none of the function blocks $F_3$ to $F_5$ is dependent on $F_2$. The function block $F_2$ therefore retains the initially allocated value of zero for the normalized horizontal displacement $H(F_2)$. During the last pass of the outer loop, needed in the examples selected, the normalized horizontal displacement $H(F_1)$ of the function block $F_1$ is initially set to be equal to the normalized horizontal extension $\Delta H(F_2)$ of the function block $F_2$ during the first pass of the inner loop. During the second pass of the inner loop, the normalized horizontal displacement $H(F_1)$, however, is then allocated the sum of the normalized horizontal displacement $H(F_3)$ of the function block $F_3$ and its normalized horizontal extension $\Delta H(F_3)$ since the function block $F_3$ is dependent on the function block $F_1$ and the said sum is greater than the normalized horizontal displacement $H(F_1)$ which was obtained in the first pass of the inner loop due to the normalized horizontal extension $\Delta H(F_2)$ of the function block $F_2$. During the other two passes of the inner loop, which are required in the case of the example, for taking into account also the function blocks $F_4$ and $F_5$, the normalized horizontal displacement $H(F_1)$ of the function block $F_1$ does not change since the sums formed with respect to these function blocks are in each case smaller than the sum formed with respect to the function block $F_3$.

The result of the method according to the invention and described above, for determining the horizontal displacements $H(F_i)$ of the function blocks $F_i$ can also be expressed in the following manner: a function block $F_i$, on which no other function block $F_i$ is dependent, receives a horizontal displacement $H(F_i)$ from zero. A function block on which other function blocks $F_i$ are dependent follows in the function diagram the function block $F_i$ dependent on it and ending furthest to the left.

Now the normalized vertical extensions of the part function diagrams representing the part sequences $S_j$ and their normalized vertical displacement in the graphic representation are still to be determined. In FIG. 5, the example of the part sequence $S_2$ is used for representing its normalized vertical extension, designated by $\Delta V(S_2)$, and its normalized vertical displacement, designated by $V(S_2)$.

A third set of variables allocated to the part sequences $S_j$ is provided for the normalized vertical extensions $\Delta V(S_j)$ in the second part 9.2 of the main memory 9, if necessary again in the file. These variables are also designated by $\Delta V(S_j)$, corresponding to previous practice. Correspondingly, a fourth set of variables, given the designation $V(S_j)$ in the paragraphs following, is provided for the normalized vertical displacements $V(S_j)$ of the part sequences $S_j$.

The values of the relative vertical extensions $V(S_j)$, which are allocated to the variables of the third set in accordance with the invention, in each case correspond to twice the number of function calls $F_i$ in the respective part sequence $S_j$ plus the number of input parameters $x_i$, $z_i$ not generated in the respective part sequence itself less the number of the first and last input parameters $z_i$, generated in the respective part sequence $S_j$ itself, in the parameter lists of the individual function calls $F_i$ in the respective part sequence $S_j$.

Using the example of the part sequence $S_4$, calculation of these values is explained in greater detail. In the file, the split-off section corresponding to the part sequence has the following structure:

| | |
|---|---|
| $F_8$ | $(z_1, z_9, z_5)$ |
| $F_9$ | $(x_{10}, xz_6)$ |
| $F_{10}$ | $(z_6, x_{11}, z_7)$ |
| $F_{11}$ | $(z_5, z_7, z_8)$ |

The number of function calls $F_i$ in the part sequence $S_4$ is equal to 4. This number must be doubled which results in 8. As can be seen directly from the structure of the split-off section but also from FIG. 2 or 4, only the input parameters $z_1$ and $x_9$ to $x_{11}$, that is to say a total of only 4 input parameters of the three function calls $F_8$, $F_9$ and $F_{10}$ are not generated in the part sequence $S_4$ itself. Therefore, 4 must be added to the previously determined value 8 which results in 12. Of the first input parameters $z_i$ in the parameter lists of the function calls $F_8$ to $F_{11}$, only the input parameters $z_6$ of the function call $F_{10}$ and $z_5$ of the function call $F_{11}$ are generated in the part sequence $S_4$ itself. Of the last input parameters $z_i$, only the input parameter $z_7$ of the function call $F_{11}$ is generated in the part sequence $S_4$ itself in the parameter lists of the function calls $F_8$ to $F_{11}$. The number of the first and last input parameters $z_i$, generated in the part sequence $S_4$ itself, in the parameter lists of the function calls $F_8$ to $F_{11}$ is therefore equal to 3. This value of 3 must be subtracted from the previously determined value 12 which results in 9 as the final value of the normalized vertical extension $\Delta V(S_4)$ of the part sequence $S_4$. As can be easily seen from FIGS. 2, 4 or 5, the normalized vertical extension $\Delta V(S_j)$ of the part sequences $S_j$ happens to correspond to a multiple of the minimum distance maintained in each case between two signals. It must also be mentioned that, in the case where only a single input parameter is present in the parameter list of a function call $F_i$ and this parameter is generated in the respective part sequence itself, it must be counted as first and last input parameter, that is to say twice.

As last operation, the similarly designated normalized vertical displacements of the part sequences $S_j$ must be allocated to the variables $V(S_j)$ of the fourth set.

These are in each case obtained from the sum of the values of the variables $\Delta V(S_j)$ of the third set which are allocated to the part sequences $S_j$ preceding the respective part sequence $S_j$ in the sequence of part sequences $S_j$ in the file.

Figure 7:
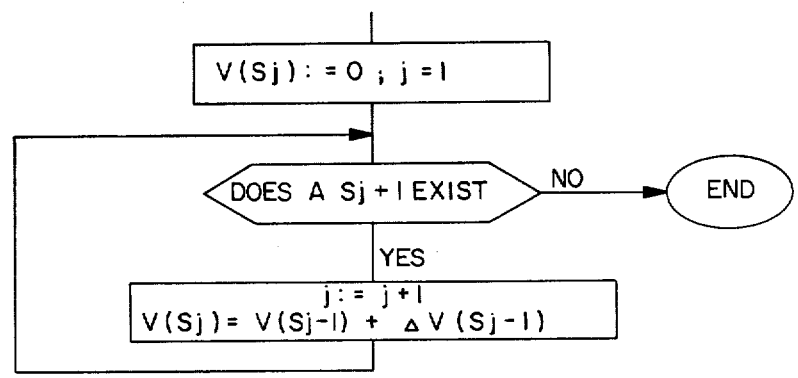
FIG. 7 shows a third flow chart for explaining the operations, provided in accordance with the invention, for determining the vertical shift of the individual part function diagrams representing the part sequences.

This operation is also illustrated by means of a flow chart shown by FIG. 7.

According to the top box of FIG. 7, first the value of zero is allocated to all variables $V(S_j)$ of the fourth set which is expressed by $V(S_j):=0$, and the value of 1 is allocated to the index j. The inquiry "Does an $S_{j+1}$ exist" then initiates a loop with the control index j. The program stays in the loop as long as a part sequence $S_{j+1}$ is present in the file; after the part sequence having the largest index j is reached, the loop and thus the entire operation is terminated. Within the loop, first the index j is incremented by the value 1 and then the normalized vertical displacement $V(S_j)$ of the then new part sequence $S_j$ is set to be equal to the sum of the normalized vertical displacement $V(S_{j-1})$ of its immediate predecessor in the sequence of the file and its normalized vertical extension $\Delta V(S_{j-1})$.

After the operations according to the invention, described above, have been carried out, the prerequisites exist for generating the desired function diagram with signal branchings and signal intersections on the display device 16.

In conclusion, it should also be mentioned that function diagrams which are to be read from the top to the bottom or in which the function blocks are arranged to be left-justified instead of right-justified, can be generated in analogous manner using basically the same operations.

The principles, preferred embodiments and modes of operation of the present invention have been described in the foregoing specification. The invention which is intended to be protected herein, however, is not to be construed as being limited to the particular forms disclosed, since these are to be regarded as illustrative rather than restrictive. Variations and changes may be made by those skilled in the art without departing from the spirit of the invention.

What is claimed is:

1. Apparatus for programming a stored-program controller, in which a control program of the controller, containing function calls and stored in a machine-readable form, is displayed in function-diagram representation on a graphical display device by an operating system of a digital computer, wherein said operating system of the digital computer:
   (a) searches for the function calls in the control program;
   (b) writes the function calls found sequentially with the lists of associated input and output parameters into a file;
   (c) splits the file by allocating the function calls to part sequences of function calls, in which splitting operation, beginning with the last function call, each function call, the output parameter of which does not contribute anything to the formation of an input parameter of a function call already allocated to the respective part sequence, is allocated to a new part sequence;
   (d) allocates values to a first set of variables which are allocated to the individual function calls, of the graphical representation of the function calls including edge zones on the display device;
   (e) allocates values to a second set of variables which are also allocated to the individual function calls, in which operation these values establish the normalized horizontal displacement of the function calls on the display device and in each case correspond to the largest of the sums which, for the function call considered in each case, can be formed from the values of the variables of the first set which are allocated to the function calls depending on this function call with respect to parameters;
   (f) allocates values to a third set of variables which are associated with the part sequences, in which operation the values establish the normalized vertical extension of the graphical representation of the part sequences on the display device and in each case correspond to twice the number of function calls in the respective part sequence plus the number of the input parameters not generated in the respective part sequence itself less the number of the first and last input parameters, generated in the respective part sequence itself, in the parameter lists of the individual function calls in the respective part sequence;

(g) allocates values to a fourth set of variables which, in turn, are allocated to the part sequences, in which operation the values establish the normalized vertical displacement of the part sequences on the display device and in each case result from the sum of the values of the variables of the third set which are allocated to the part sequences in the sequence of part sequences.

2. A method for programming a stored-program controller in which a control program of the controller contains function calls and is stored in a machine-readable form, wherein the control program is displayed in function-diagram representation on a graphical display device by an operating system of a digital computer, and wherein said operating system of the digital computer performs the steps of:

(a) searching for the function calls in the control program;

(b) writing the function calls found sequentially with lists of associated input and output parameters into a file;

(c) splitting the file by allocating the function calls to part sequences of function calls, in which splitting operation, beginning with the last function call, each function call, the output parameter of which does not contribute anything to the formation of an input parameter of a function call already allocated to the respective part sequence, is allocated to a new part sequence;

(d) allocating values to a first set of variables which are allocated to the individual function calls, in which first allocating operation the values establish the normalized horizontal extension of the graphical representation of the function calls including edge zones on the display device;

(e) allocating values to a second set of variables which are also allocated to the individual function calls, in which second allocating operation these values establish the normalized horizontal displacement of the function calls on the display device and in each case correspond to the largest of the sums which, for the function call considered in each case, can be formed from the values of the variables of the first set which are allocated to the function calls depending on this function call with respect to parameters;

(f) allocating values to a third set of variables which are associated with the part sequences, in which third allocating operation the values establish the normalized vertical extension of the graphical representation of the part sequences on the display device and in each case correspond to twice the number of function calls in the respective part sequence plus the number of the input parameters not generated in the respective part sequence less the number of the first and last input parameters, generated in the respective part sequence, in the parameter lists of the individual function calls in the respective part sequence;

(g) allocating values to a fourth set of variables which, in turn, are allocated to the part sequences, in which operation the values establish the normalized vertical displacement of the part sequences on the display device and in each case result from the sum of the values of the variables of the third set which are allocated to the part sequences in the sequence of part sequences.

* * * * *